United States Patent
Seo et al.

(10) Patent No.: US 10,735,728 B2
(45) Date of Patent: Aug. 4, 2020

(54) METHOD FOR PROCESSING IMAGE AND APPARATUS THEREFOR

(71) Applicant: LG ELECTRONICS INC., Seoul (KR)

(72) Inventors: Jungdong Seo, Seoul (KR); Jaehyun Lim, Seoul (KR); Naeri Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 15/767,267

(22) PCT Filed: Sep. 22, 2016

(86) PCT No.: PCT/KR2016/010585
§ 371 (c)(1),
(2) Date: Apr. 10, 2018

(87) PCT Pub. No.: WO2017/065422
PCT Pub. Date: Apr. 20, 2017

(65) Prior Publication Data
US 2019/0058881 A1 Feb. 21, 2019

Related U.S. Application Data

(60) Provisional application No. 62/240,486, filed on Oct. 12, 2015.

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/136* (2014.11); *H04N 19/176* (2014.11); *H04N 19/44* (2014.11); *H04N 19/70* (2014.11)

(58) Field of Classification Search
None
See application file for complete search history.

(56) References Cited

U.S. PATENT DOCUMENTS

2011/0293001 A1* 12/2011 Lim .................... G06K 9/36
 375/240.12
2012/0321206 A1* 12/2012 Sato .................... H04N 19/80
 382/233

(Continued)

FOREIGN PATENT DOCUMENTS

KR 20140082915 A 7/2014
KR 20150021981 A 3/2015
(Continued)

*Primary Examiner* — Vikkram Bali
(74) *Attorney, Agent, or Firm* — Dentons US LLP

(57) ABSTRACT

Disclosed are a method for processing an image and an apparatus therefor. Specifically, a method for decoding an image comprises: a step of deriving an initial block size information indicating information in which a first block, which is a basic unit for dividing an image, is divided into one or more initial blocks; a step of deriving a division information indicating information in which the initial block is divided into a plurality of second blocks in the initial block unit divided from the first block based on the initial block size information; and a step of decoding in a second block unit recursively divided from the initial block based on the division information.

2 Claims, 11 Drawing Sheets

(51) Int. Cl.
*H04N 19/44* (2014.01)
*H04N 19/70* (2014.01)
*H04N 19/136* (2014.01)

(56) References Cited

U.S. PATENT DOCUMENTS

2014/0126645 A1* 5/2014 Lim .................. H04N 19/105
  375/240.16
2015/0189269 A1* 7/2015 Han .................. H04N 19/176
  375/240.12
2015/0229967 A1* 8/2015 Lee .................... H04N 19/30
  375/240.02
2016/0044327 A1* 2/2016 Kim .................... H04N 19/44
  382/233

FOREIGN PATENT DOCUMENTS

| KR | 20150075065 A | 7/2015 |
| KR | 20150095232 A | 8/2015 |
| KR | 20150104221 A | 9/2015 |

* cited by examiner

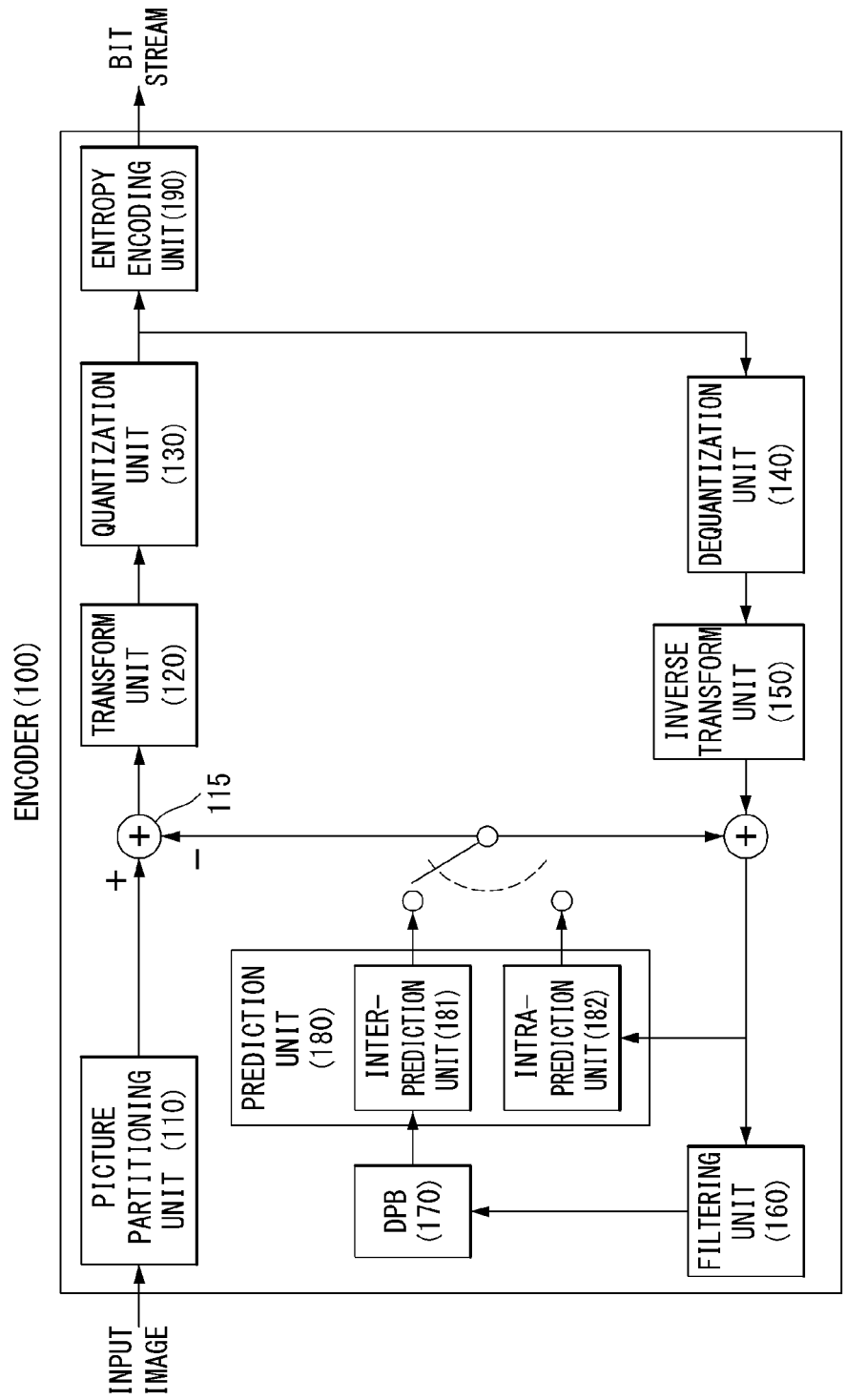
[Fig. 1]

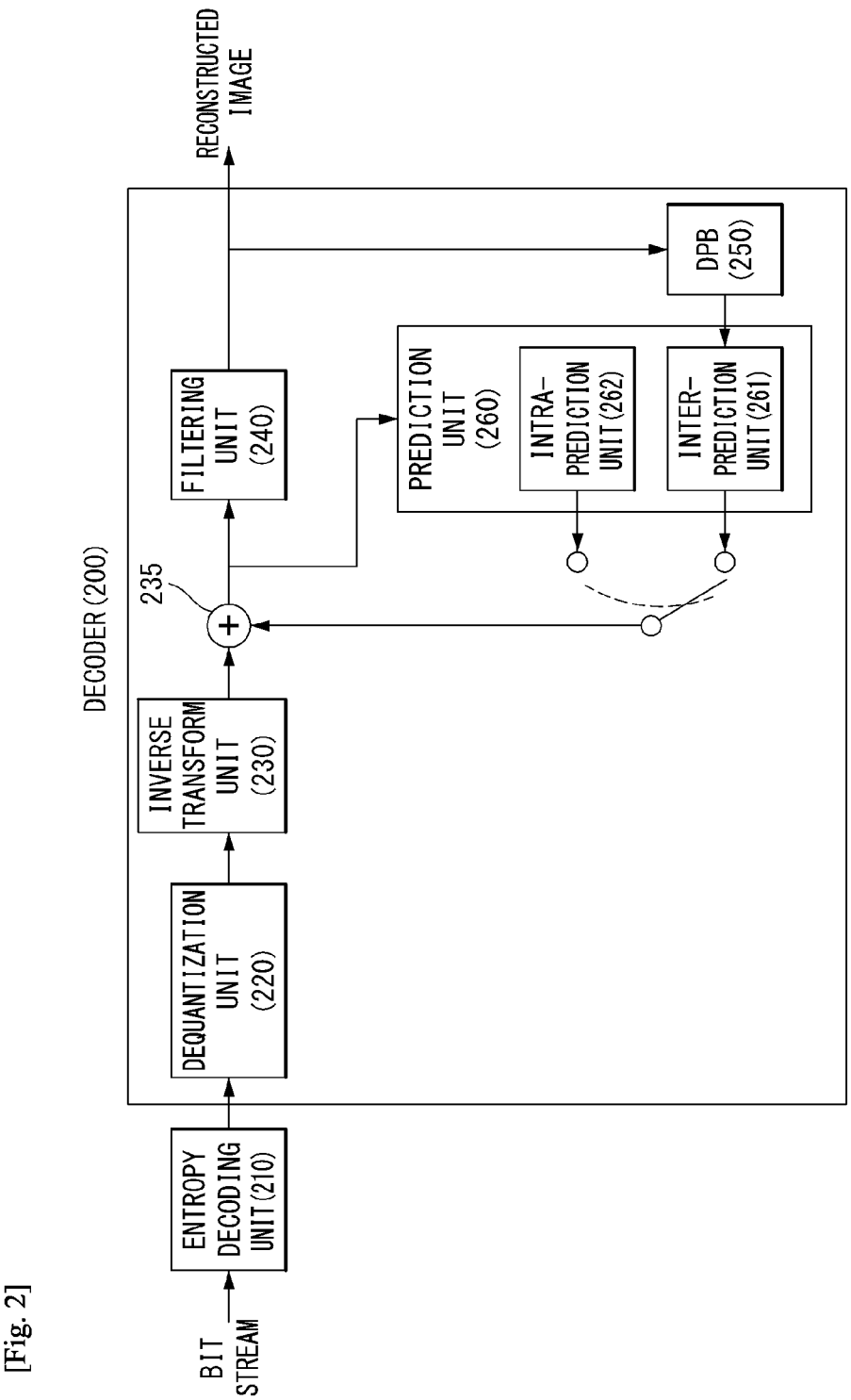
[Fig. 2]

[Fig. 3]
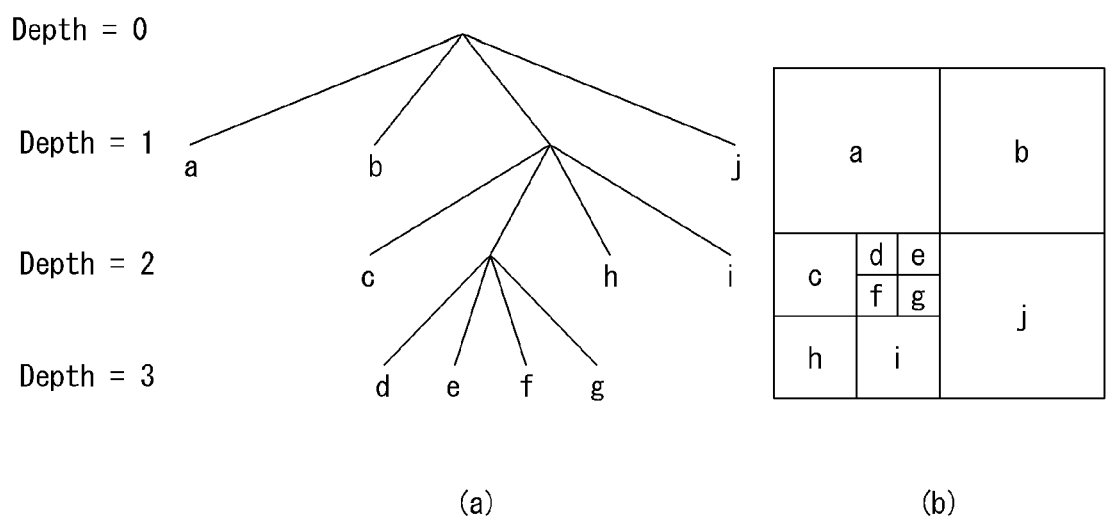
(a)            (b)

[Fig. 4]
Intra:
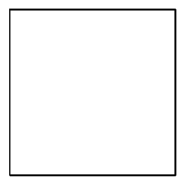 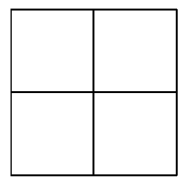
2Nx2N  NxN
Inter:
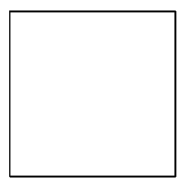 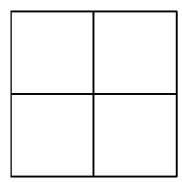 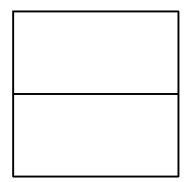 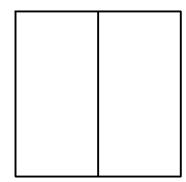
2Nx2N  NxN  2NxN  Nx2N
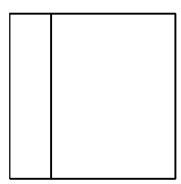 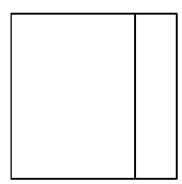 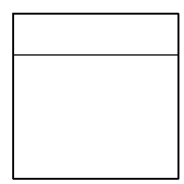 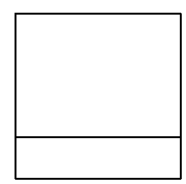
nLx2N  nRx2N  2NxnU  2NxnD

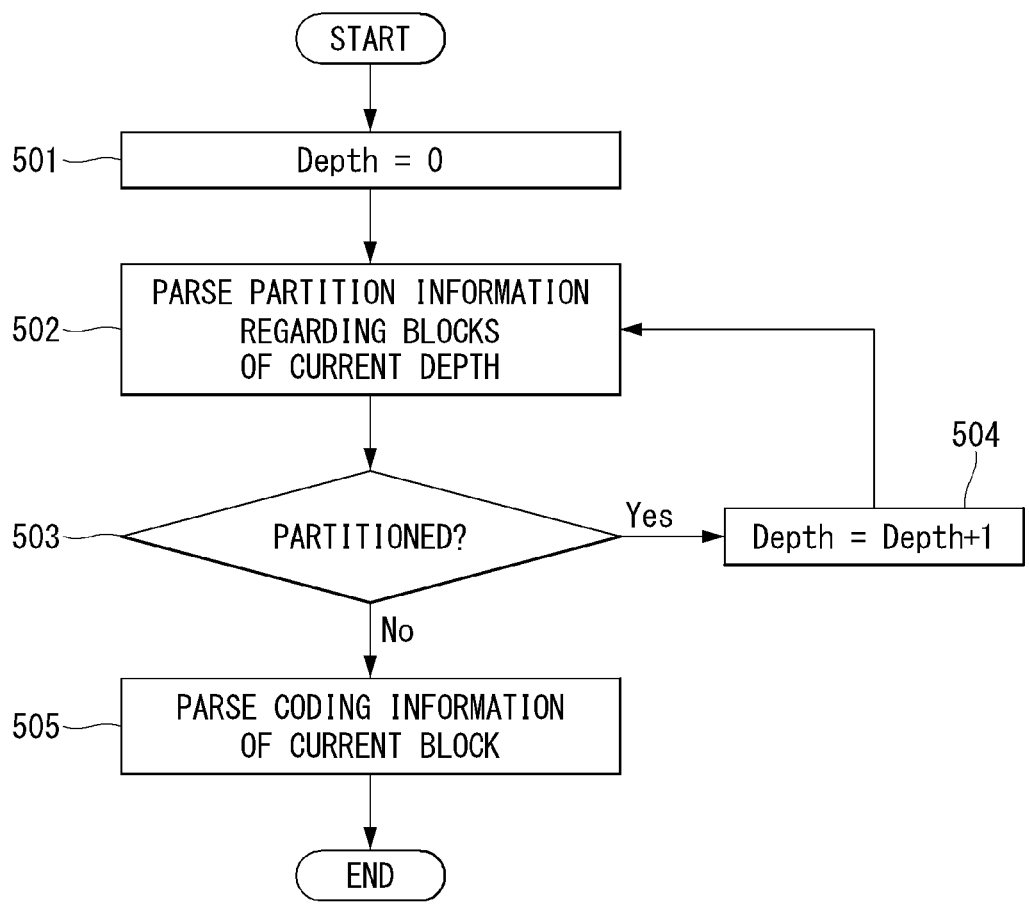
[Fig. 5]

[Fig. 6]
(a)
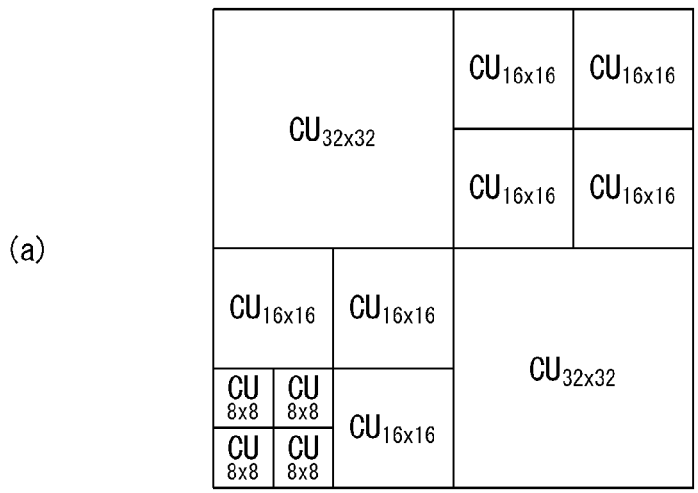
(b)
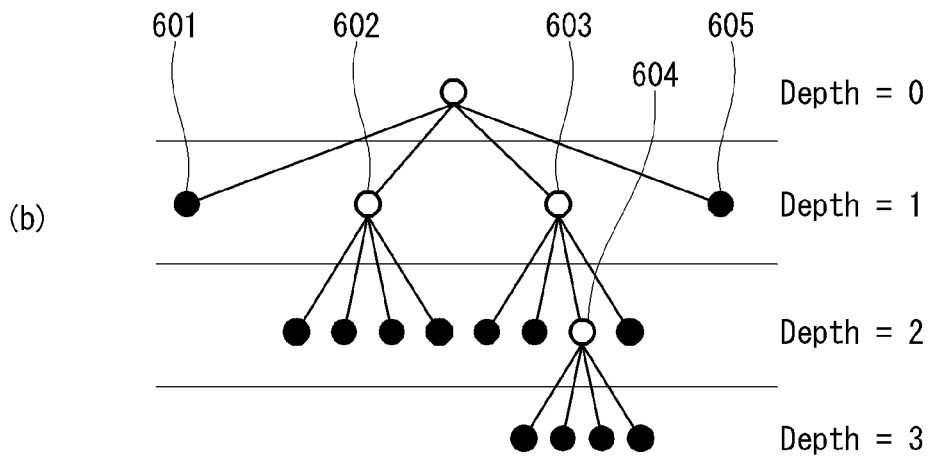

[Fig. 7]
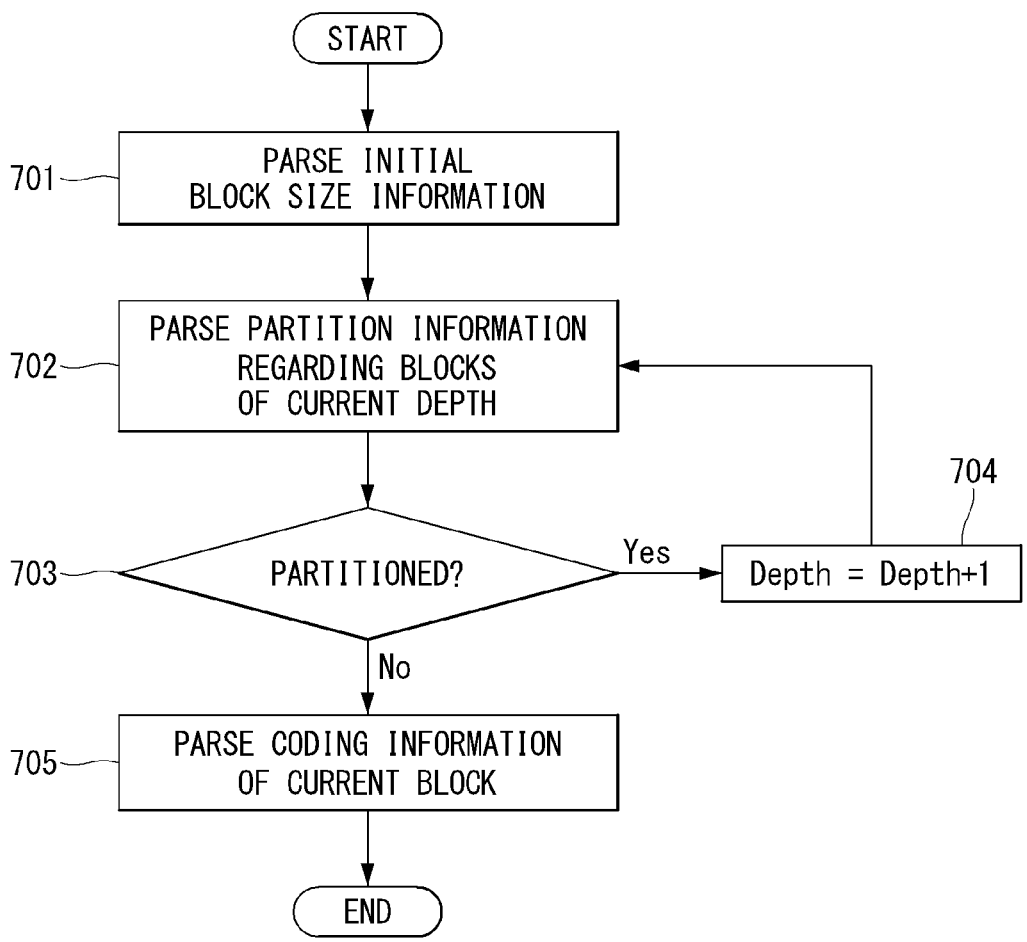

[Fig. 8]
(a) 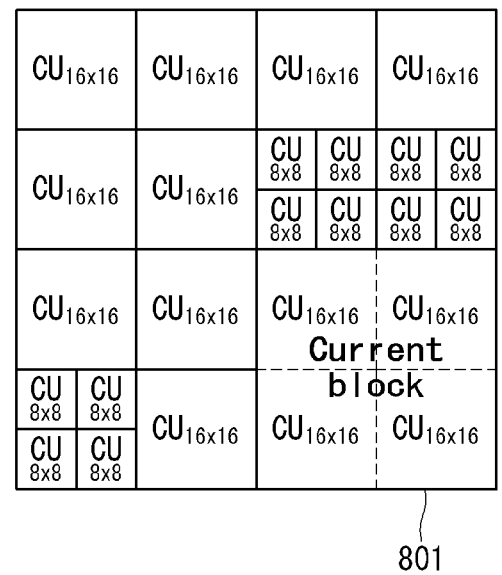
801
(b) 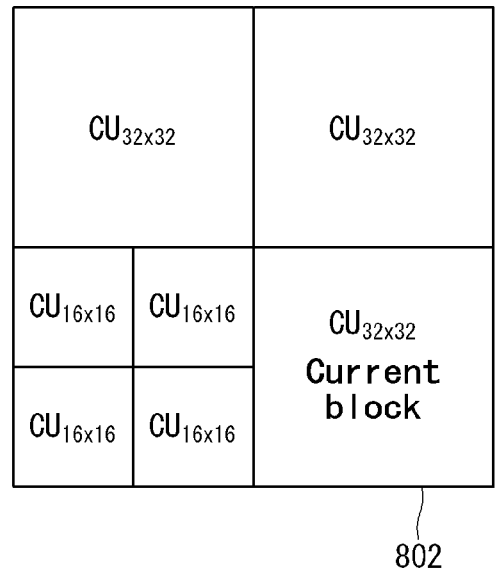
802

[Fig. 9]
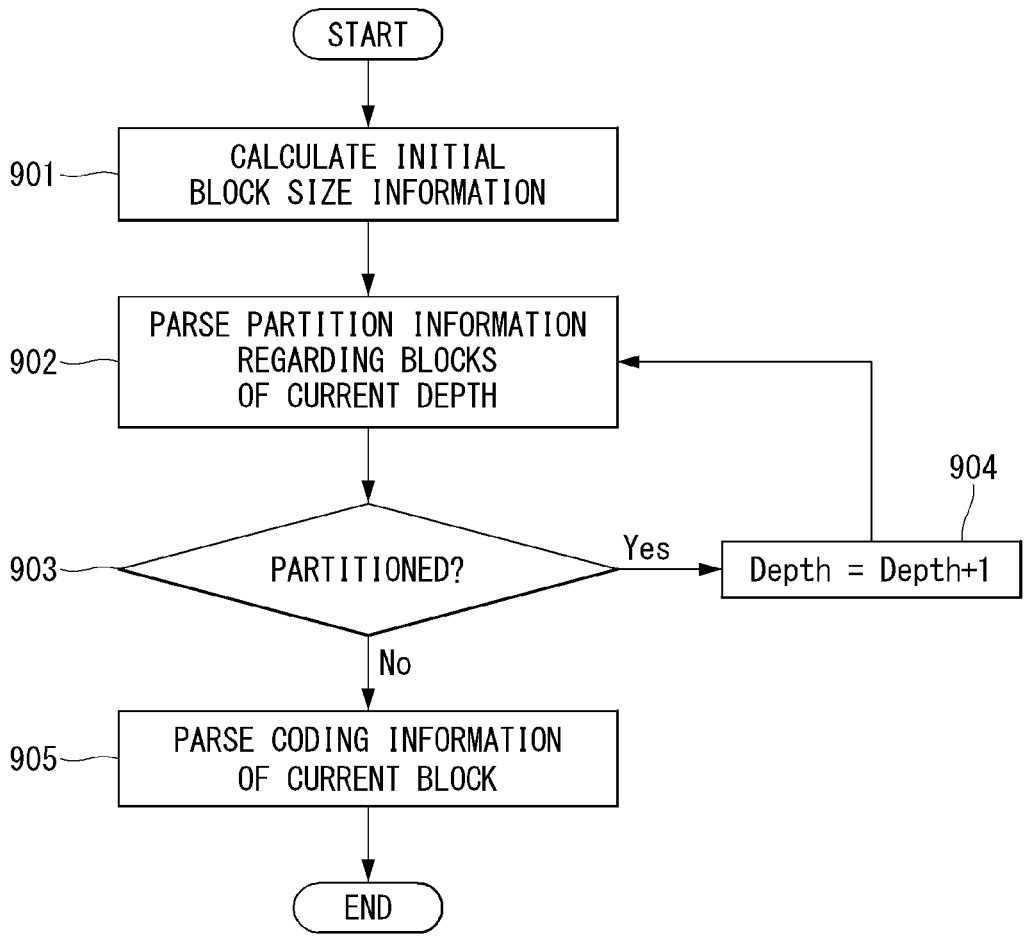

[Fig. 10]
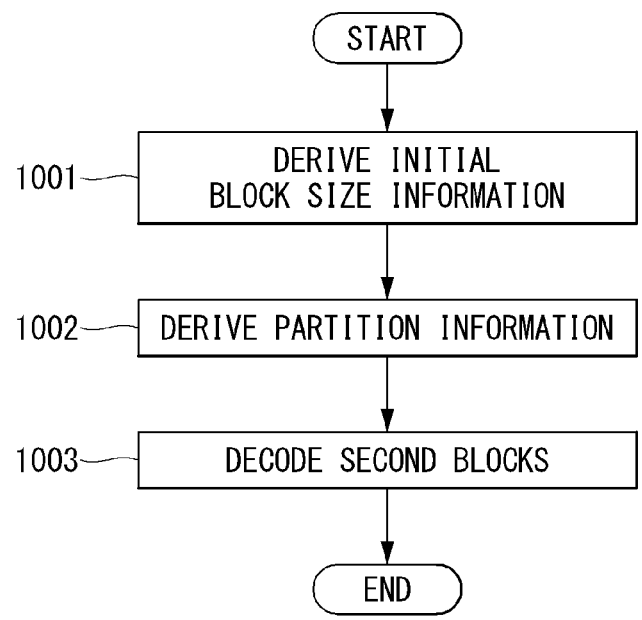

[Fig. 11]
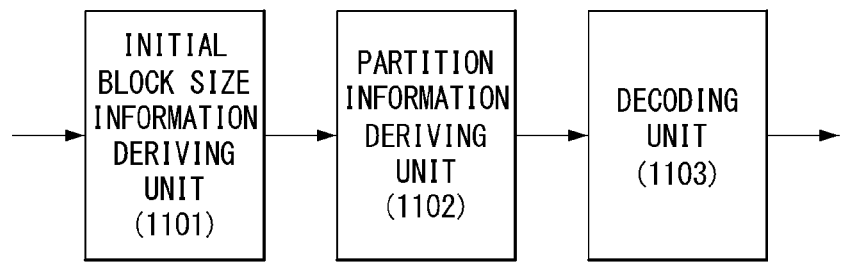

METHOD FOR PROCESSING IMAGE AND APPARATUS THEREFOR

CROSS-REFERENCE TO RELATED APPLICATIONS

This application is the National Stage filing under 35 U.S.C. 371 of International Application No. PCT/KR2016/010585, filed on Sep. 22, 2016, which claims the benefit of U.S. Provisional Application No. 62/240,486, filed on Oct. 12, 2015 the contents of which are all hereby incorporated by reference herein in their entirety.

TECHNICAL FIELD

The present invention relates to a method for processing a still image or video, and more particularly, to a method for adjusting a size of a block used as a basic unit in an encoding/decoding process, particularly, in inter-prediction or intra-prediction, and an apparatus for supporting the same

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

In a conventional still image or video compression technique, a prediction process is performed in units of blocks. Each picture is partitioned into coding tree units (CTUs) and prediction is performed on each CTU. Here, when a picture is partitioned into smaller blocks according to a rate-distortion theory, if a coding block has high efficiency, the corresponding block is partitioned and prediction is performed thereon. Recently, as a size of an input image is increased from an HD level image to a UHD level image, a size of a basic block is also increased. If a large number of partitions are performed in such an environment, there is a problem that the number of bits for representing partition information may increase to degrade coding efficiency.

In order to solve the above problems, the present invention proposes a method of transmitting size information of an initial block.

Also, the present invention proposes a method of adaptively adjusting a size of an initial block according to characteristics of an image.

Technical subjects obtainable from the present invention are not limited by the above-mentioned technical task and other unmentioned technical tasks can be clearly understood from the following description by those having ordinary skill in the art to which the present invention pertains.

Technical Solution

In an aspect of the present invention, a method for decoding an image may include: deriving an initial block size information indicating information in which a first block representing a basic unit for partitioning an image is partitioned into at least one initial block; deriving a partition information indicating information in which the at least one initial block is partitioned into a plurality of second blocks in units of the initial block partitioned from the first block based on the initial block size information; and decoding the image in units of second blocks recursively partitioned from the initial block based on the partition information.

In another aspect of the present invention, an apparatus for decoding an image may include: an initial block size information deriving unit deriving an initial block size information indicating information in which a first block representing a basic unit for partitioning an image is partitioned into at least one initial block; a partition information deriving unit deriving a partition information indicating information in which the at least one initial block is partitioned into a plurality of second blocks in units of the initial block partitioned from the first block based on the initial block size information; and a decoding unit decoding the image in units of second blocks recursively partitioned from the initial block based on the partition information.

Preferably, the initial block size information may be transmitted from an encoder.

Preferably, the initial block size information may be derived from partition information of a block which neighbors the first block.

Preferably, the initial block size information may be in inverse proportion to a degree of partitioning of the block which neighbors the first block.

Preferably, the initial block size information may be calculated by comparing a value derived from a size of the block which neighbors the first block with a specific threshold.

Preferably, the initial block size information may be calculated by comparing a cost-functionalized value with a specific threshold on the basis of a degree of partitioning the block which neighbors the first block.

Advantageous Effects

According to an embodiment of the present invention, information generated by block partition may be minimized to increase coding efficiency and to transmit more image information in the same bandwidth.

Advantages and effects of the present invention that may be obtained in the present invention are not limited to the foregoing effects and any other technical effects not mentioned herein may be easily understood by a person skilled in the art from the present disclosure and accompanying drawings.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is a diagram illustrating a method for decoding partition information of a block, as an embodiment to which the present invention may be applied.

FIG. 6 is a diagram illustrating a method of coding partitioned block partition information, as an embodiment to which the present invention may be applied.

FIG. 7 is a diagram illustrating a method of decoding partitioning information of a partitioned block, as an embodiment to which the present invention may be applied.

FIG. 8 is a diagram illustrating a method of adjusting the size of an initial block according to an embodiment of the present invention.

FIG. 9 is a diagram illustrating a method of decoding partitioning information of a block, as an embodiment to which the present invention may be applied.

FIG. 10 is a diagram illustrating a method of decoding an image according to an embodiment of the present invention.

FIG. 11 is a diagram illustrating an apparatus for decoding an image according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called a "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the present invention is not limited thereto, and a processing unit may be construed as a meaning including a unit for a luma component and a unit for a chroma component.

Furthermore, a processing unit is not essentially limited to a square block and may be constructed in a polygon form having three or more vertices.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

In particular, the transform unit 120 according to the present invention may perform transform by reconstructing a processing block in a square block if a current processing block is not a square block. The transform unit 120 is described in detail later.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality may be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 illustrated in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

Processing Unit Partition Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter-prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and 1 have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Image Encoding/Decoding Method

The HEVC partitions an image (or picture) into CTUs and performs encoding/decoding in units of the partitioned CTUs. Each CTU is partitioned into blocks in the form of a quad tree, and intra-picture prediction (or intra-prediction) or inter-picture prediction (or inter-prediction) is performed in units of CUs. Here, block partition information (or block division information) generated in the process of partitioning (or dividing) the CTU into CUs will be described with reference to the following drawing.

FIG. 5 is a diagram illustrating a method of decoding block partition information as an embodiment to which the present invention may be applied.

A decoder sets a depth value of a current block which starts to be decoded, to zero (S501).

In other words, the decoder may perform decoding on the current block from a root node of a quadtree (i.e., depth=0).

The decoder parses the partition information regarding the blocking of the current depth (S502).

For example, when an encoder indicates a case where partitioning is made (or partitioning occurs or partitioning is performed) in each node and a case where partitioning is not made using a split flag, the decoder may parse the split flag from a bit stream received from the encoder.

The decoder determines whether the block of the current depth is partitioned (S503).

For example, the decoder may partition the block if the split flag value parsed in step S502 is 1, and may not partition the block if the split flag value is 0.

If it is determined in step S503 that partitioning has been performed, the decoder may increase the current depth by 1 (S504).

For example, if the split flag value parsed in step S502 is 1 (that is, if partitioning has been performed), the decoder may increase the current depth by 1 and parse the partition information again regarding blocks having the depth increased by 1 (i.e., lower depth).

If it is determined in step S503 that partitioning has not been performed, the decoder parses coding information of the current block (S505).

For example, if the value of the split flag parsed in step S502 is 0 (that is, if partitioning has not been performed), the decoder may not decode the block partition information any further and may parse coding information of the block having the current depth.

That is, the decoder recursively parses the block partition information until partitioning is cannot be performed any further. A method of representing partition information by the encoder will be described with reference to the following drawing.

FIG. 6 is a diagram illustrating a method of coding partitioned block partition information according to an embodiment to which the present invention may be applied.

Referring to FIG. 6, it is assumed that a CTU having a size of 64×64 is partitioned into a quad tree form.

As described above with reference to FIG. 3, a root node of the quadtree corresponds to CTU and has a depth of 0 (depth=0). When the CTU is partitioned, subnodes having a depth of 1 (depth=1) are created.

Referring to FIG. 6B, among nodes having a depth of 1 (depth=1), a first node 601 and a fourth node 605 are no further partitioned as leaf nodes. Meanwhile, a second node 602 and a third node 603 are partitioned into subnodes having a depth of 2 (depth=2). Among nodes having the depth of 2 (depth=2), only a seventh node 604 is partitioned into subnodes, and the other remaining nodes than the seventh node 604 are no further partitioned as leaf nodes.

Nodes having a depth of 3 (depth=3) are no further partitioned as leaf nodes.

In this case, the encoder indicates, by a split flag, a case where partitioning is made in each node and a case where partitioning is not made, and in case where partitioning is made, the encoder may indicate whether partitioning is made again in each partitioned node by a split flag again, thereby recursively representing block partition information.

For example, assuming that the encoder represents a code (or a flag) corresponding to a case where partitioning is made is represented by 1 and a code (or a flag) corresponding to a case where partitioning is not made is represented by 0, when partitioning is made as illustrated in FIG. 6B, the encoder may generate a code of 1/0/10000/100100000/0 to indicate partition information. If the encoder explicitly transmits a minimum size of the CU to the decoder by 8λ8, the encoder may generate a code of 1/0/10000/10010/0 to represent the partition information as illustrated in FIG. 6B.

That is, in the HEVC, the partition information of the block from the root node (that is, depth=0) is represented using the split flag regardless of the characteristics of the intra-picture area, and partition information of the block is recursively represented using the split flag again in each partitioned node. In case where a plurality of regions having different characteristics exist in one picture, block partition information may be generated and coded regardless of the characteristics of the intra-picture area, and this may cause an unnecessary bit (or rate).

Recently, as the size of an input image tends to be increased from an HD level to a UHD level, the size of a basic unit (i.e., CTU in HEVC) for partitioning an image has also been increased. In such a situation, according to the existing block partitioning representation method, in case where partitioning is performed more, the partition information of a block must be transmitted in units of blocks, increasing bits (i.e., rate) representing it to degrade coding efficiency.

In order to solve the problem, in the present invention, the size of an initial block used in an encoding/decoding process of an image is adaptively selected, so that, in an area where partitioning is made more, coding starts in a small block, and in an area where partitioning is made less, coding starts in a large block to minimize partition information.

Thus, the present invention proposes a method (or an algorithm) for adjusting a size of an initial block in an image encoder/decoder. The size of an initial may be set to be large in a low-complexity area and may be set to be small in a high-complexity area, whereby information generated by block partitioning may be minimized to increase coding performance.

Hereinafter, in the description of the present invention, for the purposes of description, a basic unit for partitioning an image (or picture) may be referred to as a first block (CTU in the case of HEVC, for example). However, this may only be an example and the basic unit for partitioning one image (or picture) may be referred to as a name other than the first block.

Also, the initial block may refer to a basic unit of a coding unit which has been partitioned from a first block and starts to be actually coded.

In the description of the present invention, for the purposes of description, a basic unit of a coding unit partitioned from an initial block on the basis of block partition information decoded in units of initial blocks will be referred to as a second block (CU in the case of HEVC, for example). However, this is merely an example and the basic unit of coding in which intra-picture prediction or inter-picture prediction is performed may be referred to as a name other than the second block.

Also, an initial depth refers to a depth to which partitioning is made from a first block to the initial block, that is, the number of times by which the first block is partitioned to the initial block.

By adjusting a size of the initial block, block partition information generated according to partitioning from the first block to the initial block may be reduced. For example, when a size of the first block is 256×256 and a size of the initial block is 32×32 (the initial depth is 3), 4 bits generated due to a partition information flag of a block having the size of 128×128 and 16 bits generated due to a partition information flag of a block having a size of 64×64, a total of 20 bits, may be saved, compared with the existing block partitioning method.

The following methods may be applied to adjust the size of the initial block.

1) Method of directly transmitting the size of the initial block

2) Method of adaptively adjusting the size of the initial block using partitioned information of neighboring blocks In the first method, the encoder directly transmits size information of the initial block to the decoder in every first block.

The encoder may set the size of the initial block in every first block in consideration of characteristics of an image and transmit the set size information of the initial block to the decoder.

The decoder may derive the size information of the initial block from a bit stream received from the encoder. Also, the decoder may partition the first block into the derived initial block units and perform decoding in units of the divided initial blocks.

Here, the encoder may transmit the initial depth (init_depth) value, for example, as information for indicating the size of the initial block.

Table 1 illustrates an example of syntax when the method of transmitting the size of the initial block is applied.

TABLE 1

| coding_tree_unit( ) { | Descriptor |
|---|---|
|   init_depth | ae(v) |
|   xCtb = ( CtbAddrInRs % PicWidthInCtbsY ) << CtbLog2SizeY | |
|   yCtb = ( CtbAddrInRs/PicWidthInCtbsY ) << CtbLog2SizeY | |
|   if( slice_sao_luma_flag \|\| slice_sao_chroma_flag ) | |
|     sao( xCtb >> CtbLog2SizeY, yCtb >> CtbLog2SizeY ) | |
|   initCbS = 1 << ( CtbLog2SizeY − init_depth ) | |
|   for ( j= yCtb; j < ( (CtbAddrInRs/PicWidthInCtbsY + 1 ) << CtbLog2SizeY ) ; j+= initCbS ) | |
|     for ( i= xCtb; i < ( ( CtbAddrInRs % PicWidthInCtbsY + 1 ) << CtbLog2SizeY ) ; i += initCbS ) | |
|       coding_quadtree( i, j, CtbLog2SizeY− init_depth, init_depth ) | |
| } | |

Referring to Table 1, the first block is assumed to be a coding tree unit (CTU).

The encoder may signal the init_depth value for each CTU (i.e., the first block) to transmit size information of the initial block to the decoder. The decoder may calculate initCbs, the size of the initial block within each CTU by parsing the init_depth value in units of CTUs. Also, the decoder may perform decoding in units of blocks each having the initCbs size.

Specifically, the decoding process for coding_tree_unit will be described with reference to Table 1.

init_depth: When a decoding process for CTU 'coding_tree_unit ( )' is called, the decoder parses init_depth.

Here, init_depth (i.e., initial depth) may refer to a depth to which the first block is partitioned to the initial block, i.e., the number of times by which the first block is partitioned to the initial block, as described above. Thus, the size (initCbs) of the initial block may be derived from the init_depth value.

xCtb=(CtbAddrinRs % PicWidthlnCtbsY)<<Ctb Log 2SizeY: Also, the decoder sets xCtb to a value obtained by left-shifting the remnant obtained by dividing CtbAddrinRs by PicWidthlnCtbsY, by Ctb Log 2SizeY.

Here, CtbAddrinRs may represent an index value of the current CTU in the current picture on which decoding is performed. PicWidthlnCtbsY may indicate the number of CTUs existing in a width direction in a luminance component of the current picture. Ctb Log 2SizeY refers to a value obtained by taking log 2 in the magnitude of the CTB of the luminance component.

yCtb=(CtbAddrinRs/PicWidthlnCtbsY)<<Ctb Log 2SizeY: Also, the decoder sets yCtb to a value obtained by left-shifting a value obtained by dividing CtbAddrinRs by PicWidthlnCtbsY, by Ctb Log 2SizeY.

if(slice_sao_luma_flag||slice_sao_chroma_flag): The decoder determines whether a value of slice_sao_luma_flag or slice_sao_chroma_flag is 1.

Here, slice_sao_luma_flag may indicate whether or not SAO (sample adaptive offset) is applied to a luminance component. Also, slice_sao_chroma_flag may indicate whether SAO is applied to a chrominance component.

sao (xCtb>>Ctb Log 2SizeY, yCtb>>Ctb Log 2SizeY): If the value of slice_sao_luma_flag or slice_sao_chroma_flag is 1, that is, when SAO is applied to the luminance component or chrominance component, the decoder calls a sao (xCtb>>Ctb Log 2SizeY, yCtb>>Ctb Log 2SizeY) function.

initCbS=1<<(Ctb Log 2SizeY−init_depth): The decoder sets initCbs to a value obtained by left-shifting 1 by a value obtained by subtracting init_depth from Ctb Log 2SizeY.

The decoder may set initCbs to a size value of the initial block having the initial depth (init_depth).

for (j=yCtb; j<((CtbAddrinRs/PicWidthlnCtbsY+1) <<Ctb Log 2SizeY); j+=initCbS)

for (i=xCtb; i<((CtbAddrinRs % PicWidthlnCtbsY+1) <<Ctb Log 2SizeY); i+=initCbS)

coding_quadtree (i, j, Ctb Log 2SizeY−init_depth, init_depth): The decoder calls the coding_quadtree function in units of initial blocks having the size of initCbs from the current CTU.

Referring to the decoding process for the coding tree unit of Table 1, the decoder may calculate the initCbs, which is the size of the initial block on which encoding is actually performed within the first block, by parsing the init_depth value in every first block. Also, the decoder may partition the first block to initial block units and perform actual decoding on an initial block basis.

In HEVC, the decoder calls the coding_quadtree function from the CTU and then parses the split flag in the coding_quadtree function. Also, the decoder partitions the block in the quad tree manner according to the split flag information, calls the coding_quadtree function again in units of the partitioned blocks again, and parses the split flag.

Meanwhile, in the present invention, by calling the coding_quadtree function in the initial block units having an init_depth by using the init_depth (initial depth) value transmitted from the encoder, bits used for representing information divided form the first block to the initial block may be saved.

The transmission method of the initial depth (init_depth) described above is merely an example, and the encoder may transmit initial block size information or initial depth information, which is partitioned from the first block, to the decoder by using various methods.

For example, the encoder may directly transmit the size of the initial block, not the initial depth (init_depth) illustrated in Table 1. Here, the decoder may perform decoding in units of initial blocks received from the encoder.

Also, in order to reduce the number of bits for representing the size of the initial block, the index mapped to the size of the available initial block may be tabulated and stored in advance by the encoder and the decoder. Here, the encoder may transmit the size information of the initial block to the decoder by transmitting an index value corresponding to the set size of the initial block. The decoder may derive the size of the initial block using the index value received from the encoder and perform decoding in the derived initial block unit.

FIG. 7 is a diagram illustrating a method of decoding partition information of a block according to an embodiment to which the present invention may be applied.

The decoder parses size information of the initial block (S701).

That is, when the encoder sets the size of the initial block and signals the set size information of the initial block to the decoder, the decoder may parse the initial block size information from a bit stream received from the encoder.

As illustrated in Table 1, when the encoder signals the initial depth value to the decoder as the size information of the initial block, the decoder extracts the initial depth (init depth) from the bit stream received from the encoder may derive the size of the initial block by parsing the initial depth (init depth) from a bit stream received from the encoder.

Also, as described above, in case where the encoder/decoder tabulates the index mapped to the size of an available initial block and stores the same and the encoder signals an index value corresponding to the initial block size, the decoder may derive the size of the initial block by parsing the index from a bit stream received from the encoder.

The decoder parses the partition information regarding the current depth block (S702).

In other words, the decoder may partition the first block to the initial blocks using the initial block size information parsed in step S701, and parse partition information of the blocks from the partitioned initial blocks (or blocks having the initial depth (init_depth)).

In this case, in case where the encoder indicates a case where partitioning is made in each node and a case in which partitioning is not made in each node, by using the split flag, the decoder may parse the split flag in units of the initial blocks.

The decoder determines whether the block having the current depth is partitioned (S703).

For example, the decoder may partition the block when the split flag value parsed in step S702 is 1, and may not partition the block if the split flag value is 0.

If it is determined in step S703 that partitioning is made, the decoder increases the current depth by 1 (S704).

For example, if the value of the split flag parsed in step S702 is 1 (that is, when partitioning has been made), the decoder may increase the current depth by 1 and parse the partition information again on the blocks having the depth (i.e., the lower depth) increased by 1.

If it is determined in step S703 that partitioning is not made, the decoder parses the coding information of the current block (S705).

For example, if the value of the split flag parsed in step S702 is 0 (that is, if partitioning has not been performed), the decoder may not decode the partition information of the block any further and perform decoding by parsing coding information of the block having the current depth.

Therefore, unlike the block partition information encoding/decoding method described above with reference to FIGS. 5 and 6, whether partitioning is made is determined by recursively parsing the block partition information from the initial block other than a block (first block) having a depth of 0 (depth=0), and thus, bits used for representing information partitioned from the first block to the initial block may be saved.

That is, the decoder partitions the first block into initial blocks using the size information of the initial block and recursively parses the partition information of the block until partitioning is not made any further in units of the partitioned initial blocks.

The second method is adaptively adjusting the size of the initial block using the partitioned information of neighboring blocks.

If the encoder does not directly transmit the size of the initial block, the transmitting end (i.e., the encoder) and the receiving end (i.e., the decoder) may derive (or infer) the size of the initial block in the same manner and apply the same to coding/decoding.

Here, the encoder/decoder may derive the initial block size of the current block (i.e., the first block) using the partition information of the neighboring block (or a block adjacent to the current block (i.e., the first block).

Here, the neighboring blocks may refer to neighboring blocks in relation to the current block (i.e., the first block). Assuming that coding/decoding is performed by a raster scan method, the neighboring blocks may be blocks located on the left, upper left, upper end, and upper right end of the current block with reference to the current block (i.e., blocks on which coding/decoding has already been performed).

Also, the neighboring blocks may follow the definition of HEVC. In other words, the neighboring blocks may be a CTU, a CU, a PU, or a TU.

FIG. 8 is a diagram for explaining a method of adjusting a size of an initial block according to an embodiment of the present invention.

Referring to FIG. 8, it is assumed that the size of the first block is 32×32 for the purposes of description. Referring to FIG. 8A, since the neighboring blocks (for example, the left side, the upper left end, and the upper block ⌐ ) are partitioned more on the basis of the current block 801, the encoder/decoder may set the size of the initial block to 16×16.

Meanwhile, referring to FIG. 8B, since the neighboring blocks (e.g., left, upper left, and upper blocks) are less partitioned less based on the current block 802, the encoder/decoder may set the size of the initial block in the current block 802 to 32×32.

That is, the encoder/decoder may determine the size of the initial block in the current blocks 801 and 802 using the partition information of the neighboring blocks.

Here, the encoder/decoder may determine (or derive) the size of the initial block using the partition information of the neighboring blocks by various methods. For example, the encoder/decoder may derive the size of the initial block using a degree of partitioning of neighboring blocks, a partitioned depth of neighboring blocks, the size of neighboring blocks, and the like.

Specifically, for example, the encoder/decoder may functionalize partition information of the block and derive the size of the initial block using the functionalized value derived from the neighboring blocks.

For example, the encoder/decoder may calculate the size of the initial block by accumulating cost-functionalized values according to the sizes of neighboring blocks and comparing the accumulated values with a specific threshold.

Equation 1 shows an example in which the sizes of neighboring blocks are expressed by a cost function.

$$P(x, y) = \begin{cases} 1, & \text{when size of block}(x, y) \text{ is } 64 \times 64 \\ 2, & \text{when size of block}(x, y) \text{ is } 32 \times 32 \\ 4, & \text{when size of block}(x, y) \text{ is } 16 \times 16 \\ 8, & \text{when size of block}(x, y) \text{ is } 8 \times 8 \\ 10, & \text{otherwise} \end{cases} \quad \text{[Equation 1]}$$

Here, P(x,y) is a function of outputting a value set according to the size of a block present in the position of (x,y) and a value thereof may be set according to a size of each block from 64×64 to 8×8. Also, as described above, the block input to the function P(x,y) may correspond to the CU, PU, TU, and the like, as well as the first block (i.e., the CTU in the case of HEVC, for example).

Equation 2 shows a function of accumulating a functionalized value derived from a size of a neighboring block.

$$f(x,y)=P(x-1,y)+P(x-1,y-1)+P(x,y-1)+P(x+CTUsize,y-1)$$ [Equation 2]

Here, f(x,y) is a function of accumulating P( ) values of neighboring blocks output through Equation 1. Here, (x,y) may refer to the coordinates of the upper left pixel in the current block. That is, f(x,y) may accumulate P( ) values derived from the sizes of neighboring blocks located on the left, upper left, upper and upper right ends of the position of the upper left pixel of the current block.

The encoder/decoder may derive the size of the initial block by comparing the value f(x,y) derived from Equation 2 with a specific threshold.

In Equation 1 and Equation 2, the case where the size values of the neighboring blocks are functionalized is described as an example, but the present invention is not limited thereto.

That is, the encoder/decoder may derive the size of the initial block by adding the size values of the neighboring blocks and comparing the same with a specific value or may derive the size of the initial block using a partition depth of the neighboring blocks.

In addition, the encoder/decoder may calculate the size of the initial block by tabularizing values mapped according to block sizes and storing the same, and accumulating values corresponding to the sizes of the neighboring blocks.

In addition, the encoder/decoder may calculate the initial depth in proportion to a degree of partitioning of the neighboring blocks and the depth of partitioning of the neighboring blocks, or may calculate the size of the initial block in inverse proportion to the degree of partitioning of the neighboring blocks and the depth of partitioning of the neighboring blocks.

In addition, the encoder/decoder may perform normalization in consideration of a case where no neighboring block exists.

In other words, when a neighboring block does not exist, partitioned information in the current picture cannot be obtained. Therefore, in this case, the encoder/decoder may determine the size of the initial block of the current block using information other than the partitioned information of the neighboring blocks.

For example, the encoder/decoder may determine the size of the initial block of the current block by using an average value of the degree of partitioning in the entire sequence. Also, the encoder/decoder may determine the size of the initial block of the current block with reference to a partitioned average value of reference pictures of previously decoded picture or current picture, a degree of partitioning of a region corresponding to the same position in the previously decoded picture or reference picture as that of the current picture, and the like.

FIG. 9 is a diagram illustrating a method of decoding partition information of a block, as an embodiment to which the present invention may be applied.

The decoder calculates size information of an initial block (S901).

As described above, the decoder may derive (or infer) a size of an initial block in the same manner as that of the encoder and apply the same to decoding. Here, the decoder may derive the initial block size of the current block (i.e., the first block) using the partition information of neighboring blocks.

Specifically, for example, the decoder may functionalize partition information of the neighboring blocks and derive the size of an initial block using the functionalized value derived from the neighboring blocks.

For example, the decoder may calculate the initial block size by accumulating cost-functionalized values according to the size of the neighboring blocks and comparing the accumulated value with a specific threshold.

That is, the decoder may immediately derive the size of the initial block by adding the size value of the neighboring blocks and comparing the size value of the neighboring blocks with a specific value, or deriving the size of the initial block using a depth of partitioning of the neighboring blocks.

In addition, the decoder may calculate the size of the initial block by tabularizing values mapped according to the size of the block and storing the same, and accumulating values corresponding to the sizes of neighboring blocks.

In addition, the decoder may calculate the initial depth in proportion to the degree of partitioning of the neighboring blocks and the depth of partitioning of neighboring blocks, or may calculate the size of the initial block in inverse proportion to the degree of partitioning of the neighboring blocks and the depth of partition of the neighboring blocks.

The decoder parses the partition information regarding the blocks of the current depth (S902).

In other words, the decoder may partition the first block to the initial blocks using the initial block size information calculated in step S901, and parse the block partition information from the partitioned initial blocks.

In this case, in case where the encoder indicates the case in which partitioning is made in each node and a case in which partitioning is not made by using a split flag, the decoder may parse the split flag in units of the initial blocks.

For example, the decoder determines whether the block of the current depth is partitioned (S903).

For example, the decoder may partition the block when the value of the split flag parsed in step S902 is 1, and may not partition the block when the value of the split flag is 0.

If it is determined in step S903 that partitioning has been made, the decoder increases the current depth by 1 (S904).

For example, if the value of the split flag parsed in step S902 is 1 (that is, when partitioning was made), the decoder may increase the current depth by 1 and parse the partition information again for blocks having a depth increased by 1 (i.e., lower depth).

If it is determined in step S903 that partitioning has not been made, the decoder parses coding information of the current block (S905).

For example, if the value of the split flag parsed in step S902 is 0 (that is, partitioning has not been made), the decoder does not decode the partition information of the block any further, and may parse the coding information of the block having the current depth to perform decoding.

Therefore, unlike the block partition information encoding/decoding method described above with reference to FIGS. 5 and 6, whether partitioning is made is determined by recursively parsing the block partition information from the initial block other than a block (first block) having a depth of 0 (depth=0), and thus, bits used for representing information partitioned from the first block to the initial block may be saved.

FIG. 10 is a diagram illustrating a method of decoding an image according to an embodiment of the present invention.

The decoder derives initial block size information indicating information in which a first block, which is a basic unit for partitioning an image, is partitioned into one or more initial blocks (S1001).

As described above, the encoder may set the size of the initial block in every first block in consideration of characteristics of an image and transmit the set size information of the initial block to the decoder. In this case, the decoder may derive the size information of the initial block from a bit stream received from the encoder. Also, the decoder may partition the first block into the derived initial block units and perform decoding in units of the divided initial blocks.

As described above with reference to FIG. 7, for example, when the encoder signals the initial depth value to the decoder as the size information of the initial block, the decoder extracts the initial depth (init depth) from the bit stream received from the encoder may derive the size of the initial block by parsing the initial depth (init depth) from a bit stream received from the encoder.

Also, as described above, in case where the encoder/decoder tabulates the index mapped to the size of an available initial block and stores the same and the encoder signals an index value corresponding to the initial block size, the decoder may derive the size of the initial block by parsing the index from a bit stream received from the encoder.

As described above with reference to FIGS. 8 and 9, the decoder may derive (or infer) a size of an initial block in the same manner as that of the encoder and apply the same to decoding. Here, the decoder may derive the initial block size of the current block (i.e., the first block) using the partition information of neighboring blocks.

Specifically, for example, the encoder/decoder may functionalize partition information of a block, and derive the size of an initial block using the functionalized value derived from the neighboring blocks.

For example, the encoder/decoder may calculate the initial block size by accumulating cost-functionalized values according to the size of the neighboring blocks and comparing the accumulated value with a specific threshold.

That is, the encoder/decoder may immediately derive the size of the initial block by adding the size value of the neighboring blocks and comparing the size value of the neighboring blocks with a specific value, or deriving the size of the initial block using a depth of partitioning of the neighboring blocks.

Also, the encoder/decoder may calculate the size of the initial block by tabularizing values mapped according to the size of the block and storing the same, and accumulating values corresponding to the sizes of neighboring blocks.

Also, the encoder/decoder may calculate the initial depth in proportion to the degree of partitioning of the neighboring blocks and the depth of partitioning of neighboring blocks, or may calculate the size of the initial block in inverse proportion to the degree of partitioning of the neighboring blocks and the depth of partition of the neighboring blocks.

The decoder obtains partition information indicating information that the initial block is divided into a plurality of second blocks in units of the initial blocks partitioned from the first block based on the initial block size information (S1002).

That is, the decoder may partition the first block into initial block units based on the initial block size information derived in step S1001. Also, the decoder may derive block partition information in which the initial block is partitioned into second blocks in units of the initial blocks.

As described above with reference to FIGS. 7 and 9, after deriving the size information of the initial block the decoder may recursively decode the block partition information in units of the initial blocks partitioned from the first block.

As described above, when the encoder signals the split flag as the block partition information, the decoder may recursively partition the block by parsing the split flag from a bit stream transmitted from the encoder.

The decoder decodes the second blocks recursively partitioned from the initial block on the basis of the partition information (S1003).

As described above, the decoder may partition the first block into initial blocks based on the initial block size information derived in step S1001. Also, the decoder may partition the initial blocks into the second blocks based on the partition information derived in step S1002. The decoder may partition the blocks until partitioning cannot be made any further in units of the initial blocks based on the partition information to determine the second blocks divided from the initial blocks.

As described above, in the description of the present invention, for the purposes of description, the basic unit of the coding unit partitioned from the initial block based on block partition information decoded in units of the initial blocks is referred to as the second block (CU in the case of HEVC, for example). However, this is merely an example, and the basic unit of coding on which intra-picture prediction or inter-picture prediction is performed may be referred to as a name other than the second block. For example, the second block may also be referred to as a coding unit (CU), a coding block (CB), a prediction unit (PU), a prediction block (PB), a transform unit (TU), or the like.

The decoder may decode the coding information of the second blocks in units of the second blocks which cannot be partitioned any further.

FIG. 11 is a diagram illustrating an apparatus for decoding an image according to an embodiment of the present invention.

Referring to FIG. 11, the decoder implements the functions, procedures and/or methods proposed in FIGS. 7 to 10 above. Specifically, the decoder may include an initial block size information deriving unit 1101, a partition information deriving unit 1102, and a decoding unit 1103.

The initial block size information deriving unit 1101 derives initial block size information indicating information in which a first block is partitioned into one or more initial blocks.

As described above, the encoder may set the size of the initial block for each first block in consideration of the characteristics of the image, and transmit the set size information of the initial block to the decoder. In this case, the initial block size information deriving unit 1101 may derive the size information of the initial block from the bit stream received from the encoder.

As described above with reference to FIG. 7, for example, when the encoder signals an initial depth value, as the size information of the initial block, to the decoder, the initial block size information deriving unit 312 may derive the size of the initial block by parsing the initial depth (init depth) from the bit stream received from the encoder.

Also, as described above, in case where the encoder/decoder tabulates the index mapped to the size of an available initial block and stores the same and the encoder signals an index value corresponding to the initial block size, the initial block size information derivation unit 1101 may derive the size of the initial block by parsing the index from a bit stream received from the encoder.

Also, as described above with reference to FIGS. 8 and 9, the decoder may derive (or infer) a size of an initial block in the same manner as that of the encoder and apply the same to decoding. Here, the initial block size information derivation unit 1101 may derive the initial block size of the current block (i.e., the first block) using the partition information of neighboring blocks.

Specifically, for example, the initial block size information derivation unit 1101 may functionalize partition information of the neighboring blocks and derive the size of an initial block using the functionalized value derived from the neighboring blocks.

For example, the initial block size information derivation unit 1101 may calculate the initial block size by accumulating cost-functionalized values according to the size of the neighboring blocks and comparing the accumulated value with a specific threshold.

That is, the initial block size information derivation unit 1101 may immediately derive the size of the initial block by adding the size value of the neighboring blocks and comparing the size value of the neighboring blocks with a specific value, or deriving the size of the initial block using a depth of partitioning of the neighboring blocks.

In addition, the initial block size information derivation unit 1101 may calculate the size of the initial block by tabularizing values mapped according to the size of the block and storing the same, and accumulating values corresponding to the sizes of neighboring blocks.

In addition, the initial block size information derivation unit 1101 may calculate the initial depth in proportion to the degree of partitioning of the neighboring blocks and the depth of partitioning of neighboring blocks, or may calculate the size of the initial block in inverse proportion to the degree of partitioning of the neighboring blocks and the depth of partition of the neighboring blocks.

The partition information deriving unit 1102 derives partition information indicating information that the initial block is partitioned into a plurality of second blocks in units of the initial blocks partitioned from the first block on the basis of initial block size information.

That is, the partition information deriving unit 1102 may derive the block partition information in which the initial block is divided into the second blocks in units of the initial blocks.

As described above with reference to FIGS. 7 and 9, the partition information deriving unit 1102 derives the size information of the initial block and subsequently recursively decodes the block partition information in units of initial blocks partitioned from the first block.

As described above, when the encoder signals the split flag as block partition information, the partition information deriving unit 1102 may recursively partition the initial block by parsing the split flag from the bit stream transmitted from the encoder.

The decoding unit 1103 decodes the second block unit recursively divided from the initial block based on the partition information.

As described above, in the description of the present invention, for the purposes of description, the basic unit of the coding unit partitioned from the initial block based on block partition information decoded in units of the initial blocks is referred to as the second block (CU in the case of HEVC, for example). However, this is merely an example, and the basic unit of coding on which intra-picture prediction or inter-picture prediction is performed may be referred to as a name other than the second block. For example, the second block may also be referred to as a coding unit (CU), a coding block (CB), a prediction unit (PU), a prediction block (PB), a transform unit (TU), or the like. The decoding unit 1103 may decode the encoding information of the second blocks in units of a second block that is no longer divided into blocks.

The decoding unit 1103 may decode the coding information of the second blocks in units of the second blocks which cannot be partitioned any further.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present invention disclosed in the appended claims.

The invention claimed is:

1. A method for decoding an image by an apparatus for decoding the image, the method comprising:
   obtaining an initial depth value for a first block, wherein the first block represents a basic unit partitioned from the image;
   deriving an initial block size of each initial blocks within the first block based on a size value of the first block and the initial depth value;
   deriving, in units of the initial blocks, partition information indicating information in which the initial block is partitioned into a plurality of second blocks; and
   decoding the image in units of second blocks recursively partitioned from the initial block based on the partition information,
   wherein the initial depth value is transmitted from an encoder,
   wherein the size value of the first block is obtained by taking log2 in a size of the first block, and
   wherein the initial block size is set to a value obtained by left-shifting 1 by a value obtained by subtracting the size value from the size value of the first block.

2. An apparatus for decoding an image, the apparatus comprising:
   a processor configured to:
   obtain an initial depth value for a first block, wherein the first block represents a basic unit partitioned from the image;
   derive an initial block size of each initial blocks within the first block based on a size value of the first block and the initial depth value;
   derive, in units of the initial blocks, partition information indicating information in which the at least one initial block is partitioned into a plurality of second blocks; and
   decode the image in units of second blocks recursively partitioned from the initial block based on the partition information,
   wherein the initial depth value is transmitted from an encoder,
   wherein the size value of the first block is obtained by taking log2 in a size of the first block, and
   wherein the initial block size is set to a value obtained by left-shifting 1 by a value obtained by subtracting the size value from the size value of the first block.

* * * * *